US010562445B2

(12) United States Patent
Krämer

(10) Patent No.: US 10,562,445 B2
(45) Date of Patent: Feb. 18, 2020

(54) AIR-GUIDING ARRANGEMENT

(71) Applicant: ILLINOIS TOOL WORKS INC., Glenview, IL (US)

(72) Inventor: Günther Krämer, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/108,884

(22) Filed: Aug. 22, 2018

(65) Prior Publication Data
US 2019/0061613 A1 Feb. 28, 2019

(30) Foreign Application Priority Data

Aug. 28, 2017 (DE) ......................... 10 2017 119 618

(51) Int. Cl.
B60Q 3/20 (2017.01)
B60Q 3/14 (2017.01)
B60Q 3/51 (2017.01)
B60H 1/34 (2006.01)

(52) U.S. Cl.
CPC ............ B60Q 3/20 (2017.02); B60H 1/3421 (2013.01); B60Q 3/14 (2017.02); B60Q 3/51 (2017.02); B60H 2001/3471 (2013.01); B60Q 2500/20 (2013.01); F24F 2221/02 (2013.01)

(58) Field of Classification Search
CPC ............... B60Q 3/20; B60Q 3/14; B60Q 3/51
See application file for complete search history.

(56) References Cited

U.S. PATENT DOCUMENTS

| 4,916,591 | A | * | 4/1990 | Schiele | ................ | B60H 1/3414 |
| | | | | | | 362/23.15 |
| 6,437,704 | B1 | * | 8/2002 | Nodinger | ........... | B60H 1/00985 |
| | | | | | | 340/815.4 |
| 8,840,287 | B2 | * | 9/2014 | An | ........................... | B60Q 3/20 |
| | | | | | | 362/23.14 |
| 10,179,542 | B1 | * | 1/2019 | Salter | ....................... | B60Q 9/00 |
| 2009/0298406 | A1 | * | 12/2009 | Norbury, Jr. | ............ | B60H 1/34 |
| | | | | | | 454/69 |

FOREIGN PATENT DOCUMENTS

DE 20118014 1/2002
DE 202013105590 1/2014

* cited by examiner

Primary Examiner — Anne M Hines
(74) Attorney, Agent, or Firm — Thompson Hine LLP

(57) ABSTRACT

An air-guiding arrangement for an air vent, includes an air-guiding element and an operating element which is movable relative to the air-guiding element and has a manually actuatable operating portion arranged on a front side of the air-guiding element, a light source being arranged in the operating portion of the operating element, at least one electrical conductor being provided which is connected, on the one hand, to the light source and can be connected, on the other hand, to an electrical supply source, and, for electrical connection between the light source and the at least one electrical conductor, at least one elastic electrical connecting element being provided which, on the one hand, is held fixedly on the air-guiding element and, on the other hand, is held fixedly on the operating element, and which deforms elastically during a relative movement between the air-guiding element and operating element.

14 Claims, 3 Drawing Sheets

AIR-GUIDING ARRANGEMENT

TECHNICAL FIELD

The invention relates to an air-guiding arrangement for an air vent, preferably for a vehicle, comprising an air-guiding element and an operating element which is movable relative to the air-guiding element and has a manually actuatable operating portion arranged on a front side of the air-guiding element.

BACKGROUND

Such air vents are used in particular in vehicles and serve for ventilating the vehicle interior. For this purpose, the air vents are connected to an air supply. As a rule, the air vents have a plurality of air-guiding elements, for example air-guiding slats, which guide the air flow in the desired direction into the vehicle interior. At least one air-guiding element comprises an operating element by means of which the air-guiding element can be pivoted for example in order to change the direction of the air flow. The air-guiding element coupled to the operating element can be coupled to further air-guiding elements such that they are pivoted synchronously. It is also possible for the air-guiding element provided with the operating element to be coupled to further air-guiding elements which can then likewise be pivoted by the operating element, but for example about a pivot axis perpendicular to the pivot axis of the air-guiding element provided with the operating element.

There is a desire for the operating element to be illuminated, in particular for night illumination, search illumination or ambient illumination. If, for example, light-emitting diodes are arranged in the region of a light outlet portion of the operating element, this results in undesirably nonuniform illumination (hot spots). It is proposed in DE 201 18 014 U1 to produce an air-guiding element which is designed as a slat from a material which is flooded with light and to load said air-guiding element by at least one narrow side with light which is distributed in the slat body and exits from a defined portion. Alternatively or in addition, it is proposed in said document to produce a setting or display element from plastic which can be flooded with light. For the electrical supply, conductor rails or conducting plastic strips in the slat are proposed, on which conductor rails or conducting plastic strips sliding contacts slide during a relative movement between the slat and an actuating element. A disadvantage with this electrical supply is that, during a relative movement between the operating element and the air-guiding element, it does not always ensure a secure electrical connection between the parts which are moved relative to one another, or that undesired sliding contacts are often required for this purpose. Such sliding contacts can lead to undesired actions of force on the movement of the operating element. In addition, there can occur undesired noise formation or wear. Moreover, sliding-contact dust, which is visible as contamination, is formed over time on the parts moved relative to one another.

In order to homogenize the light emission, DE 20 2013 105 590 U1 proposes the inclusion of an elongate light guide in a slat as an air-guiding element. The light guide extends over at least one longitudinal region of the slat and is intended to make uniform illumination of a light outlet surface possible over its entire width and length.

The partial construction of the air-guiding element from a light-permeable material or from a light guide leads, however, to it not being possible for incorrect use forces (misuse forces) to be absorbed at the level which is usually required by the vehicle manufacturer. This applies, in particular, to the deflection of air-guiding slats. Moreover, there are doubts about the durability of such systems. Thus, for example, a light-permeable PMMA material is afflicted by safety concerns, since it usually breaks in a brittle manner and tends to shatter, which can lead to considerable injuries, for example in the case of a head impact. Moreover, the electric contact via sliding contacts that is proposed in the prior art leads to an undesired influence on the movement forces of the operating element and to undesired noise generation and wear and also contamination.

SUMMARY

Proceeding from the described prior art, the object on which the invention is based is to provide an air-guiding arrangement for an air vent, which air-guiding arrangement permits reliable uniform illumination of the operating element, with undesired actions of force and noise formations or wear and contamination being avoided in particular in terms of the electrical supply.

For an air-guiding arrangement of the type stated at the outset, the invention achieves the object in that a light source is arranged in the operating portion of the operating element, in that at least one electrical conductor is provided which is connected, on the one hand, to the light source and can be connected, on the other hand, to an electrical supply source, and in that, for electrical connection between the light source and the at least one electrical conductor, at least one elastic electrical connecting element is provided which, on the one hand, is held fixedly on the air-guiding element and, on the other hand, is held fixedly on the operating element, and which deforms elastically during a relative movement between the air-guiding element and operating element. At least two electrical conductors are preferably provided which are connected, on the one hand, to the light source and can be connected or are connected, on the other hand, to an electrical supply source.

The air-guiding arrangement according to the invention is preferably provided for an air vent of a vehicle, such as a passenger car or truck. As a rule, such air vents have a housing, for example consisting of a plastic material. One or more air-guiding elements are movably mounted, for example pivotably mounted, on the housing. The air-guiding elements can likewise consist of plastic. At least one of the air-guiding elements is provided with an operating element via which said air-guiding element, and where appropriate further air-guiding elements, coupled to said air-guiding element, can be manually adjusted, for example can be pivoted, in the manner explained at the outset in order to guide the air flow in the desired manner into the space to be ventilated, for example a vehicle interior. The operating element can likewise consist of a plastic. In addition to the air-guiding element provided with the operating element, the air-guiding arrangement according to the invention can have further air-guiding elements which can be coupled in particular to the air-guiding element provided with the operating element, and which do not have to have any operating elements.

A manually actuatable operating portion of the operating element is provided on a front side which faces the space to be ventilated, for example a vehicle interior, in the mounted state. The air-guiding element, and where appropriate further provided air-guiding elements, of the air-guiding arrangement can be moved via said operating portion and thus the air flow into the space to be ventilated can be controlled. For this purpose, the operating element can be able to be moved correspondingly. According to the invention, a light source is arranged in the operating portion of the operating element that faces the space to be ventilated. As viewed counter to the air flow direction, the light source is seated ahead of the air-guiding element. Consequently, no adaptations of the air-guiding element, for example a (partially) transparent design or the like, are required according to the invention. Rather, the air-guiding element, for example an air-guiding slat, can be impermeable to light of the light source. Thus, there is no need according to the invention for a light-guiding portion to be provided within the light-guiding element. The light emitted by the light source exits uniformly and without the formation of hot spots. Since no light-guiding portions are required within the air-guiding element, a weakening of the air-guiding element can be avoided. It is possible in particular in this way also to securely meet the requirements in terms of high incorrect use forces. Moreover, a plastic material can be chosen for the air-guiding element that does not break in a brittle manner or shatter even in the event of a crash. It is also possible in the solution according to the invention to use suitable damping elements which provide a pleasant feel in the course of moving the operating element.

In the air-guiding arrangement according to the invention there is further provided at least one electrical conductor which is connected, on the one hand, to the light source and can be connected, on the other hand, to an electrical supply source. The supply source can be arranged, for example, outside the air-guiding arrangement. For electrical connection between the light source and the at least one electrical conductor, at least one elastic electrical connecting element is provided which, on the one hand, is held fixedly on the air-guiding element and, on the other hand, is held fixedly on the operating element, and which deforms elastically during a relative movement between the air-guiding element and operating element. The at least one elastic connecting element thus compensates for a relative movement between the air-guiding element and the operating element by elastic deformation. During the relative movement, it remains mechanically connected both to the air-guiding element and to the operating element either directly or via one or more connecting components. Even during a relative movement between the operating element and air-guiding element, the elastic electrical connecting element at all times offers a secure electrical connection between the parts movable relative to one another, without the sliding contacts proposed in the prior art being necessary. As a result, undesired actions of force on the movement of the operating element can be eliminated. In addition, undesired noise formation or wear and contamination can be avoided.

The invention permits uniform illumination of the operating element for ambient or search illumination without dispensing with the customary functional requirements. Since the light source is arranged directly in the operating portion forming the visible side of the operating element, the light is generated directly at the point where it is intended to be emitted. In order to improve the uniformity of the illumination, the light source can be assigned an additional diffuser. Also suitable in this respect are light guides having a system of lenses and/or prisms for the uniform lighting of the light surface, in particular if the light source comprises a plurality of light sources, such as LEDs. The light outlet surface can be directly integrated into the operating portion.

The solution according to the invention allows not only the uniform illumination of the operating element but also the reliable retention of the further arrangements on such an air-guiding arrangement. The arrangement of the light source in the operating portion can additionally ensure optimum shading against leakage light.

According to one embodiment, there can be provision that the at least one electrical transmission element is at least one elastic conductor strip which is bent in a U shape, the first leg of which is held on a first holder connected to the electrical conductor and the second leg of which is held on a second holder connected electrically to the light source.

The conductor strip is electrically conducting and can be a metal strip, for example. However, carbon fiber, for example, also comes into consideration as the material. The first and second holders are each electrically conducting. These can be metal holders, for example. Here, it is possible, for example, for the conductor strip or strips to be held by clamping in the holders. In the case of, for example, two conductor strips for two electrical conductors, there are then correspondingly two first holders and two second holders. The holders can be part of an electric plug. In this way, the first and second holders can be electrically connected to one another. The first holder can be plugged, for example, onto the respective electric plug. An assembly unit can preferably be formed from the elements of a plug which comprises the first and second holders, the elastic electrical connecting elements and the light source or a printed circuit board which holds the light source, in each case with associated contact elements, which assembly unit can be preassembled in a simple manner and can then be finally assembled as a whole. In this way, an electrical connection is also possible in the case of a rotary knob as operating element, it then being possible for the elastic electrical connecting elements to roll on a circular track. A combination between a rotational movement and a sliding movement is also possible in conjunction with said electrical connection. In principle, the aforementioned embodiments can be used in the case of every conceivable relative movement between the operating element and air-guiding element, for example even in the case of barrel-type air vents or spherical air vents, in particular even in the combination of two linear units. Moreover, two or more than two electrical conductors can also be provided, for example at least four electrical conductors. In this way, the actuation of a colored RGB light-emitting diode as light source would then be possible, which would make individually adjustable illuminating colors possible. An embodiment with three electrical conductors, for instance if control electronics for an RGB light-emitting diode are seated on a printed circuit board, or five electrical conductors, for example for the actuation of an RGBW light-emitting diode, is, of course, also possible. The actuation of an RGB or RGBW-LED would also be possible by bringing the color information to the LED as a digital signal. The associated electrical signal could, for example, be coded outside the air vent and pass, for example, via the at least one electrical conductor to the air vent, in particular to the operating element bearing the LED. There could be situated therein a decoder which correspondingly actuates the LED on the basis of the decoded information.

The at least one electrical conductor can be arranged in the air-guiding element. The electrical conductor serves for the electrical supply of the light source. Two or more electrical conductors can be provided, for example. The electrical conductors can consist of a metal. Thus, electrical conductors can be formed, for example, by metal inserts inserted into the air-guiding element. They do not have to be situated parallel to one another. The metal inserts can be integrated into the air-guiding element, for example within the scope of a plastic injection-molding process. In principle, electrically conducting plastic is also conceivable in this respect. A production would then be possible in a two-component injection-molding process. Carbon fiber also comes into consideration as the material for the electrical conductors. On the one hand, the electrical conductors can be connected for supply purposes to an external electrical voltage source via the housing of the air vent. On the other hand, the electrical conductors are connected to the light source for electrical supply. In particular for the connection between the electrical conductors and the light source, a plug connection can be provided in a manner which is simple to mount.

As an alternative to the aforementioned embodiments, an electrical connection can also occur via cables which, for example, exit on the rear side of the operating element and are guided outwardly from there through the housing of the air vent. Electrical conductors in the air-guiding element can then be dispensed with. For example, the cables can be guided out of the housing via a further air-guiding element arranged behind the air-guiding element provided with the operating element. In this case, the cables serve by means of a sufficient length to compensate for the relative movement between the operating element and air-guiding element.

The light source can comprise at least one OLED (organic light-emitting diode), for example a plurality of OLEDs, and/or at least one electroluminescent film. Such light sources make possible a particularly uniform lighting without optical elements, such as lenses or the like, being required. In addition, uniform lighting of curved surfaces can also be achieved particularly well with such light sources. These light sources can even themselves form a surface portion of the operating portion or be covered by a protective portion which is transparent to the emitted light radiation.

According to a further embodiment, the light source can comprise at least one LED, for example a plurality of LEDs. With particular advantage, the light source can comprise COB-LEDs or a plurality of COC-LEDs. COB- (chip on board) or COC- (chip on cord) LEDs can be applied directly to a printed circuit board, for example by soldering, in the form of LED chips as SMD (surface mounted device). Here, the LED chips can be provided with a housing or be applied to the printed circuit board without housing. It is possible with this COB or COC technology for a plurality of LED chips to be arranged in an array or linearly. When covered for example by a fluorescent layer, the individual LEDs are no longer separately discernible to the human eye and there results a uniformly illuminating areal or linear lighting element.

The air-guiding element can in particular be an air-guiding slat which is mounted pivotably in a housing of an air vent. Said slat can be pivotable for example about a pivot axis which is horizontal in the mounted state. For pivotable mounting, pivot pins can be formed in a manner known per se on lateral end faces of the air-guiding slat and engage in corresponding pivot bearing portions of the housing of the air vent. It is then further possible for the at least one electrical conductor to be integrated into at least one pivot pin of the air-guiding slat for pivotably mounting the air-guiding slat on the housing of the air vent. With the provision of two electrical conductors, for example, in each case one electrical conductor can be integrated into one of the pivot pins. The electrical contacting on the housing then results via the integration into the pivot pins. For this purpose, the pivot bearing portions receiving the pivot pins have corresponding electrical contacts and are connected to the external electrical supply.

According to a further embodiment, the operating portion can comprise a light outlet portion to let out the light emitted by the light source. The light outlet portion can act as a diffuser and can itself consist of a transparent or translucent material. The light outlet portion can also be provided with a decorative layer, in particular a vapor deposition, lacquering and/or electric coating. The decorative layer can have windows which allow light coming from the light source to be let out and where appropriate delimit the transilluminated region sharply with respect to the adjoining regions. Also conceivable is a transillumination of the decorative layer in order for example to achieve a day and night design. Here, the light outlet portion can at the same time serve as a protective element for the light source situated behind it.

According to a further embodiment, the light outlet portion of the operating portion can be formed by an insert portion of the operating element that is inserted into the operating portion and is permeable to light from the light source. The insert portion partially forms the outer surface of the operating portion. It can consist, for example, of a plastic, in particular a plastic with diffuser action for uniform illumination. The insert portion can furthermore be partially provided with a coating, for example a paint or chrome coating, in order to achieve a sharp delimitation of the transilluminated region. It would also be conceivable for a light-permeable portion to be integrated into the operating portion of the operating element within the scope of a two-component injection-molding process. According to a further alternative embodiment, it would also be possible to form the operating portion or even the entire operating part from a material permeable to light emitted from the light source. A coating, for example a paint or chrome coating, could then once again be provided, which coating exposes merely a desired light outlet portion. Even a perforated metal foil would be conceivable for forming the light outlet portion.

According to a further embodiment, the operating element can have a housing, the housing being arranged on the air-guiding element. For example, the housing can be pushed onto the air-guiding element. In this way, the operating element is held on the air-guiding element. The housing can have an open side, with the result that it can be pushed onto the air-guiding element. According to a further embodiment in this respect, the operating element can comprise a closing part which is releasably connected to the housing and closes one side of the housing, for example a rear side of the housing that faces away from the space to be ventilated in the mounted state. The closing part can be releasably connected to the housing, for example by a latching connection or a press fit or the like. The closing part can be connected to the housing after the housing has been pushed onto the air-guiding element in order to close the open side of the housing that is provided for mounting. The insert portion can be arranged in the housing. The light source can furthermore be held on a printed circuit board of the operating element that is arranged in the housing. The closing part can form a holding receptacle for the printed circuit board. A plug according to the aforementioned embodiments for producing the electrical connection between the light source and electrical conductors provided in the air-guiding element can also be arranged in the housing. As explained above, an assembly unit can be formed from the elements of a plug comprising the first and second holders, the elastic conductor strips and the light source or a printed circuit board which holds the light source, in each case with associated contact elements. This assembly unit can then be inserted as a whole into the housing in a particularly simple manner. Since the aforementioned components are arranged within the housing, there results a visually appealing appearance. For mounting purposes, these components can be inserted into the housing, for example from the rear side, with the closing element not yet connected to the housing. The insert portion can, for example, be inserted into the operating portion from the front side and latch therein or be held in a form-fitting manner, for example by means of suitable pins or the like. After the components have been mounted, the housing can be closed by the closing part.

However, according to an alternative embodiment, it is also possible for the operating element to have a housing lower part and a housing upper part releasably connected to the housing lower part, the air-guiding element being arranged between the housing lower part and the housing upper part. The releasable connection can once again be obtained, for example, by a latching connection or a press fit or the like. The insert portion can then be held between the housing lower part and the housing upper part. The light guide can also be held between the housing lower part and the housing upper part. A printed circuit board of the operating element that holds the light source can then likewise be held between the housing lower part and the housing upper part.

According to a further embodiment, the operating element can be a sliding operating element or a rotary operating element. A combination is also possible.

The invention also relates to an air vent, preferably for a vehicle, in particular a passenger car or a truck, comprising a housing and an air-guiding arrangement according to the invention that is arranged in the housing, the air-guiding element provided with the operating element being pivotably mounted in the housing. There can also be provided a plurality of air-guiding elements which are pivotably mounted in the housing, in which case at least one air-guiding element is provided with an illuminated operating element in the manner according to the invention. The air vent is in particular connected to an air supply. The air then flows out at the front side, the air flow being controlled by the air-guiding elements. As already explained, it is possible for example to provide a plurality of air-guiding elements, for example a plurality of air-guiding slats, which are mounted on the housing of the air vent so as to be pivotable about parallel axes. A holder, for example a fork holder, can further be provided on the operating element at the rear side of the air-guiding element, on which holder there are arranged one or more further air-guiding elements arranged behind the front air-guiding elements. These air-guiding elements, which can for example likewise be air-guiding slats, can then be pivotable for example about a pivot axis which is perpendicular to the pivot axis of the front air-guiding elements. The pivoting movement can be brought about by a lateral displacement of the operating element. The front air-guiding elements can be pivoted, for example, by tilting the air-guiding element up and down. All this is known per se.

BRIEF DESCRIPTION OF THE DRAWINGS

Exemplary embodiments of the invention will be explained in more detail below with reference to figures, in which schematically.

Unless otherwise indicated, the same reference signs designate the same objects in the figures.

DETAILED DESCRIPTION

Figure 1:
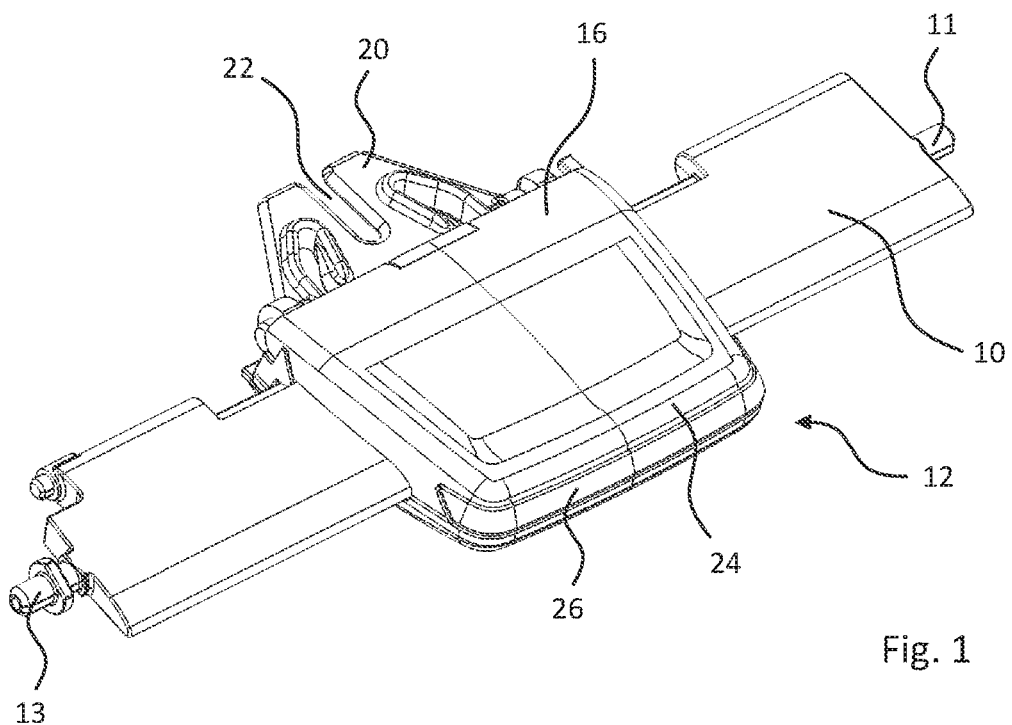
FIG. 1 shows an air-guiding arrangement according to the invention in a perspective view from above.

The air-guiding arrangement shown in FIG. 1 comprises an air-guiding element 10, an air-guiding slat 10 in the example shown, which is mounted in the housing of an air vent for a vehicle, in particular a passenger car or a truck, so as to be pivotable about a pivot axis via pivot pins 11, 13 formed on the opposite end sides. An operating element 12 movable relative to the air-guiding slat 10 is configured as a manually actuatable sliding operating element 12 in the example shown. It comprises a housing 16 which is open on one side, in the present case the rear side facing away from the vehicle interior in the mounted state, the housing 16 being arranged on the air-guiding slat 10. On the rear side facing away from the vehicle interior in the mounted state, the operating element 12 furthermore has a fork holder 20 on which at least one further air-guiding element (not represented any more specifically in FIG. 1) can be mounted, for example likewise at least one air-guiding slat. This further air-guiding element can be held in the housing of the air vent. The fork holder then determines for example the pivoting position of the further air-guiding element. The operating element 12 can be displaced relative to the air-guiding slat 10, to the left and right as seen in FIG. 1, with the result that a further air-guiding element held in the receptacle 22 of the fork holder 20 can be pivoted about an axis perpendicular to the pivot axis of the air-guiding element 10. In addition, the operating element 12 can be tilted manually upward and downward, with the result that the air-guiding slat 10 is pivoted about the pivot axis formed by the pivot pins 11, 13.

In order to actuate the operating element 12, a manually actuatable operating portion 24 is formed on the front side of the operating element 12 that faces the vehicle interior in the mounted state. An insert portion 26, which forms a light outlet portion of the operating portion 24, is inserted into the operating portion 24. The insert portion 26 is permeable to light emitted from a light source 29 arranged in the operating portion 24 and can additionally have a diffuser effect for uniform light exit. In the present example, the light source 29 comprises a plurality of light-emitting diodes. The light source 29 can comprise LEDs, for example the above-described COB-LEDs or COC-LEDs. However, it can also comprise one or more OLEDs or one or more electroluminescent films. The light source 29 is arranged on a printed circuit board 28 (PCB). The printed circuit board 28 on which the light source 29 is arranged is fastened together with the insert portion 26 in the operating element 12. Light emitted from the light source 29 is introduced into the insert portion 26, which is produced for example from a transparent or translucent plastic. It is possible to provide optical elements, such as lenses and/or prisms, in the region of coupling of the light radiation into the insert portion 26. Alternatively or in addition, it is also possible, as already mentioned, to form the insert portion 26 from a diffuse plastic. These measures ensure a particularly uniform light distribution on the front side of the insert portion 26. Also conceivable is a surface coating of the insert portion 26, for example a lacquering, a chrome coating or a metal vapor deposition or else a coating with a perforated metal foil, for example to achieve a day/night illumination. Here, certain surface regions of the insert portion 26 can also remain free in order to delimit an illuminated region clearly with respect to an unilluminated region.

Figure 2:
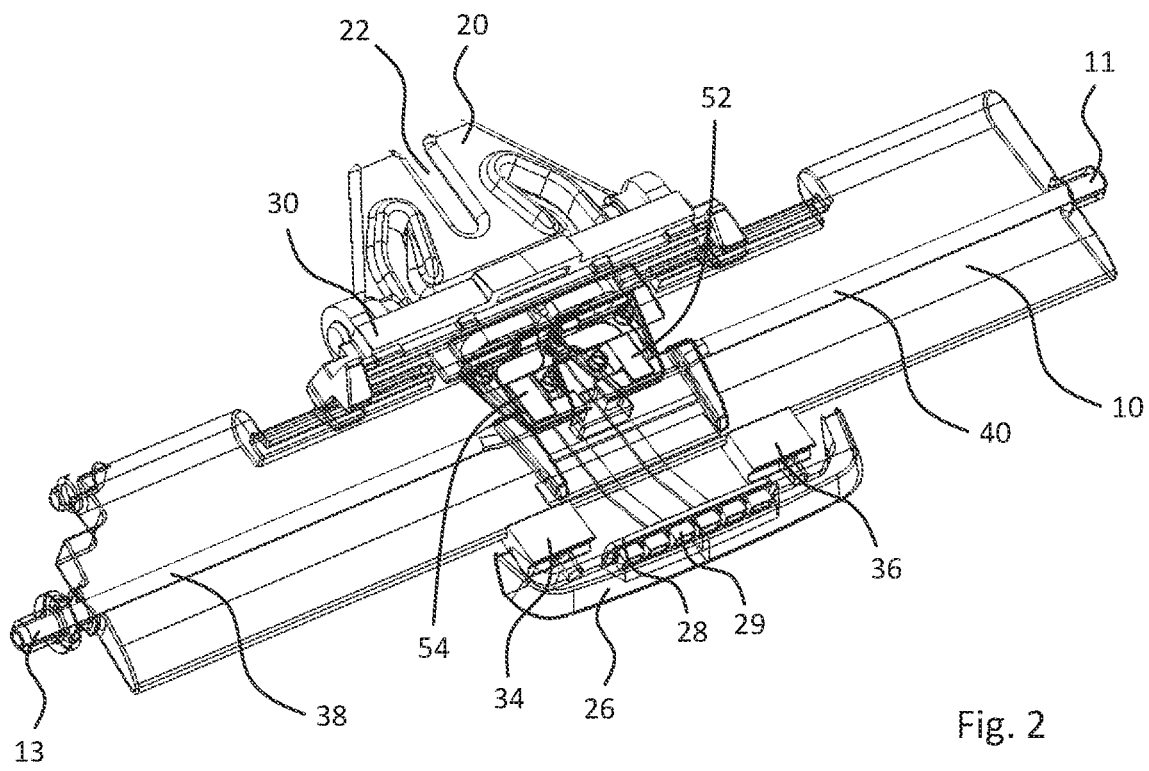
FIG. 2 shows the air-guiding arrangement from FIG. 1 in a partially transparent illustration and without the housing of the operating element.

In the case of components mounted in the housing 16, a closing part 30 arranged on the rear side of the air-guiding slat 10 that faces away from the vehicle interior in the mounted state serves for closing the open rear side of the housing 16. The closing part 30 can, for example, be releasably connected to the housing 16 by a latching connection or a press fit or the like. In FIG. 2 there can also be seen silicone dampers (reference signs 34, 36) for damping the relative movement between the operating element 12 and air-guiding slat 10.

Figure 3:
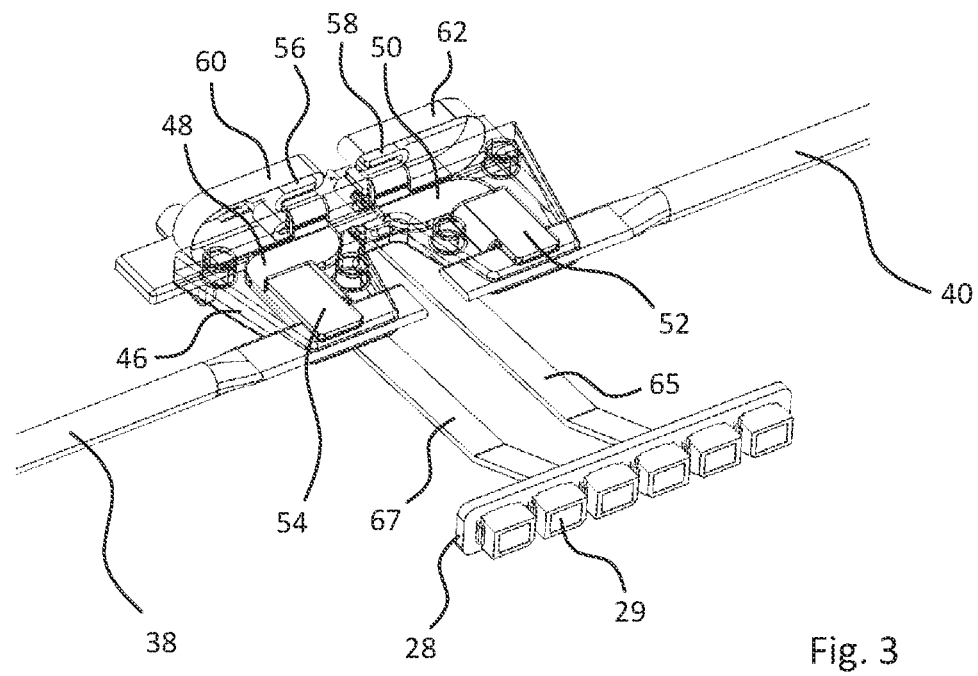
FIG. 3 shows a part of the air-guiding arrangement shown in FIG. 1 in a perspective view from above.
Figure 4:
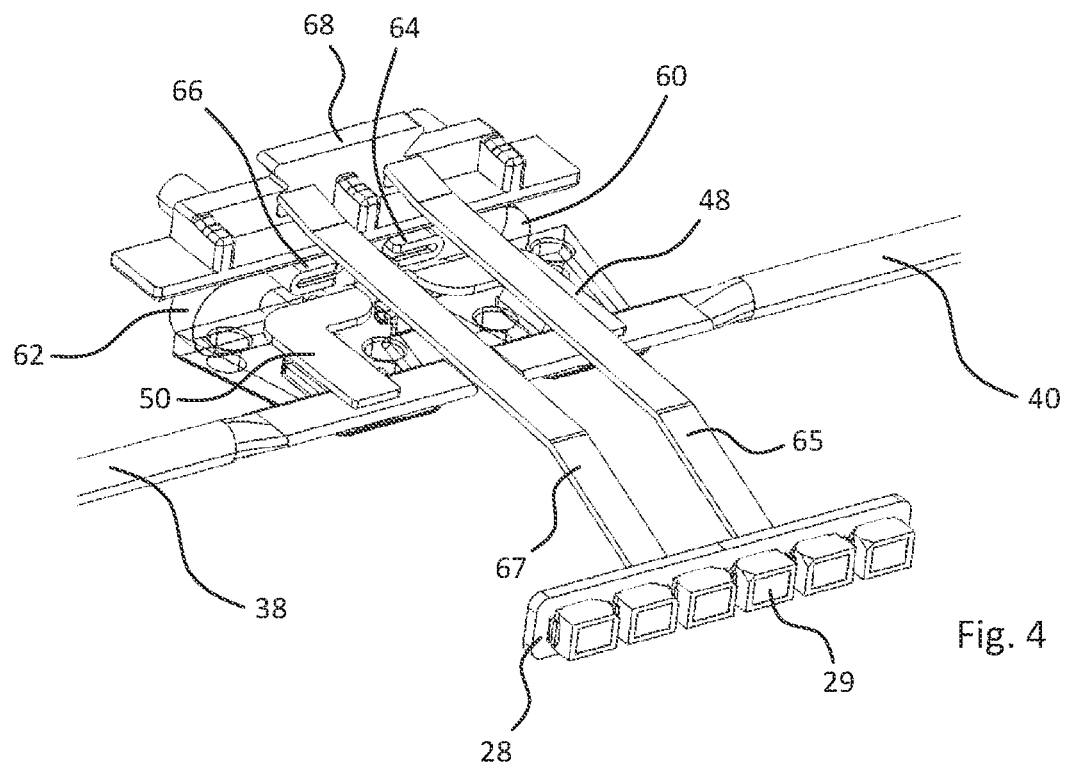
FIG. 4 shows the part of FIG. 3 in a perspective view from below.

In FIG. 2, the housing 16 is not shown for reasons of illustration. In FIGS. 3 and 4, the air-guiding slat 10, the housing 16, the insert portion 26, the fork holder 20 and the closing part 30 are not shown for reasons of illustration. In other respects, it can be seen from the partially transparent illustration of FIG. 2 that two electrical conductors 38, 40 designed as insert parts extend along the pivot axis of the air-guiding slat 10 and through the pivot pins 11, 13. In the mounted state, said conductors contact, via the pivot pins 11, 13, corresponding electrical supply contacts outside the housing 16 of the air vent that in turn are connected to an electrical supply. The electrical conductors 38, 40 could also be configured as cables, stamped and bent parts or tubes. Also conceivable as electrical conductors are flat ribbon conductors or other insert parts consisting of an electrically conducting plastic. Alternatively, it would also be conceivable to incorporate the electrical conductors 38, 40 into the air-guiding slat 10 in a two-component injection-molding process. Carbon fiber would also be suitable as a material for the electrical conductors 38, 40.

Figure 5:
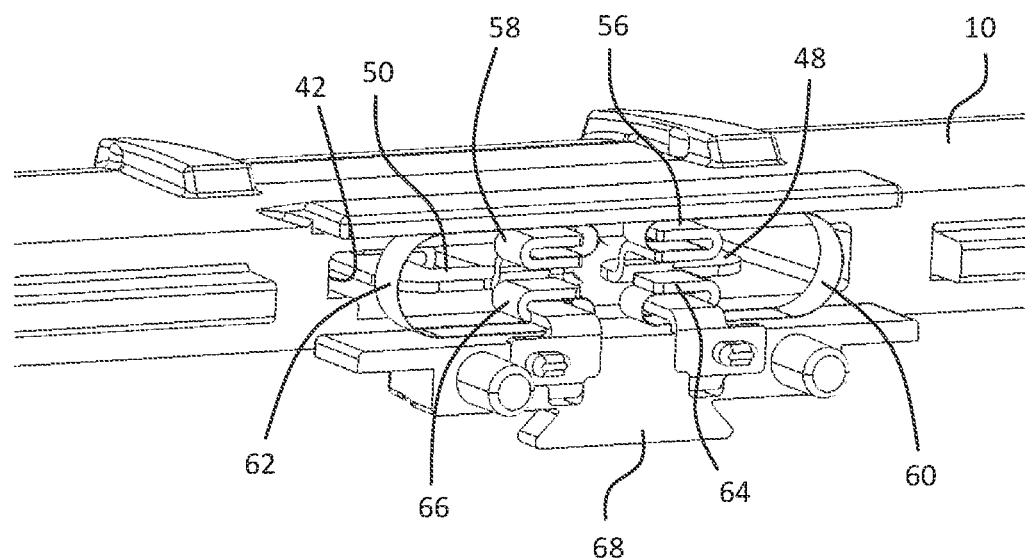
FIG. 5 shows a further view of a part of the air-guiding arrangement from FIG. 1 in a perspective rear side view.

The electrical connection between the electrical conductors 38, 40 and the printed circuit board 28 having the light source 29 will now be explained in more detail with reference to FIGS. 3 to 5. In FIG. 5, the housing 16, the fork holder 20, the insert portion 26, the closing part 30 and the printed circuit board 28 are not shown for reasons of illustration. The air-guiding slat 10 has on its rear side a cavity 42 into which the electrical conductors 38, 40 reach. In the cavity 42 there can be arranged a web which supports the cavity 42 and prevents a collapse thereof under bending stress. Moreover, the marginal layer on the upper and lower side of the air-guiding slat 10 is supported by a plug 46 (FIG. 3) which is situated at least in a partially form-fitting manner in the cavity 42. Thus, a collapse of still free-standing regions of the marginal layers under bending stress is also prevented. The plug 46 also comprises two electrical conductors 48, 50 which each comprise a first holder 52, 54 as first contact elements. The first holders 52, 54 are plugged onto the electrical conductors 38, 40 in the cavity 42 and thus produce electrically conducting contact, as can be seen in particular in FIG. 3. On the opposite sides, the electrical conductors 48, 50 of the plug 46 each comprise a second holder 56, 58 as second contact elements, on each of which an elastic conductor strip 60, 62 is held clamped.

The conductor strips 60, 62 can be metal strips, for example. However, the conductor strips 60, 62 could also consist of carbon fiber, for example. The plug 46 made up of electrical conductors 48, 50 and first and second holders 52, 54, 56, 58 can be formed in one piece and consist of metal, for example. It is also possible, for example, for the parts 58, 62 and 66 according to FIG. 5 to be produced as one component, for example as a stamped and bent part from metal foil. The adjacent plastic parts additionally impart shape and stability to this electrically conducting part. The conductor strips 60, 62 are each bent in a U shape, in each case a first leg being held on a second holder 56 or 58. A second leg of the metal strips 60, 62 bent in a U shape is in each case held clamped on a third holder 64, 66 as third contact elements (see in particular FIG. 5). The third holders 64, 66 are each connected to an electrical conductor track 65, 67 leading to the printed circuit board 28 having the light source 29. The electrical supply of the light source 29 is obtained via these conductor tracks. 65, 67. The electrical conductor tracks 65, 67 are connected to the electrical conductors 38, 40 via the third holders 64, 66, the conductor strips 60, 62, the second holders 56, 58, the electrical conductors 48, 50 and the first holders 52, 54 and are connected to the external electrical supply via said conductors 38, 40. If, in order to adjust the air flow direction, the operating element 12 is displaced laterally on the air-guiding element 10, there occurs a corresponding relative movement between the operating element 12 and the air-guiding element 10. The conductor strips 60, 62 serve to electrically bridge this relative movement. For this purpose, in the course of the relative movement, the conductor strips 60, 62 roll under elastic deformation between associated running surfaces. The running surfaces can be formed, for example, by a surface of the plug 46 or by the air-guiding slat 10 itself. In this way, a reliable electrical connection between the parts movable with respect to one another is achieved substantially without wear and noise and without undesired action of force.

An assembly unit can preferably be formed from the following elements: plug 46 with its electrical conductors 48, 50, the conductor strips 60, 62, the associated holders 52, 54, 56, 58, 64, 66 and, where appropriate, the further plug 68.

In the example shown, the third holders 64, 66 are fastened to a further plug 68. This further plug 68 is inserted into the operating element 12 from the rear side and secured to the closing part 30 of the operating element 12.

In principle, the aforementioned electrical connection is also conceivable in the case of a rotary operating element. It will be understood that the conductor strips are then configured radially such that rolling on a circular path becomes possible. Also conceivable is a combination of a rotational movement and a sliding movement of the operating element. In principle, the aforementioned electrical connection with rolling conductor strips is conceivable for each combination of movable parts. This also applies in particular to barrel-type or spherical vents, in the case of barrel-type vents for example in the combination of two linearly movable units or a combination of a linearly movable and a rotationally movable unit, and in the case of spherical vents with a rotationally movable unit.

Figure 6:
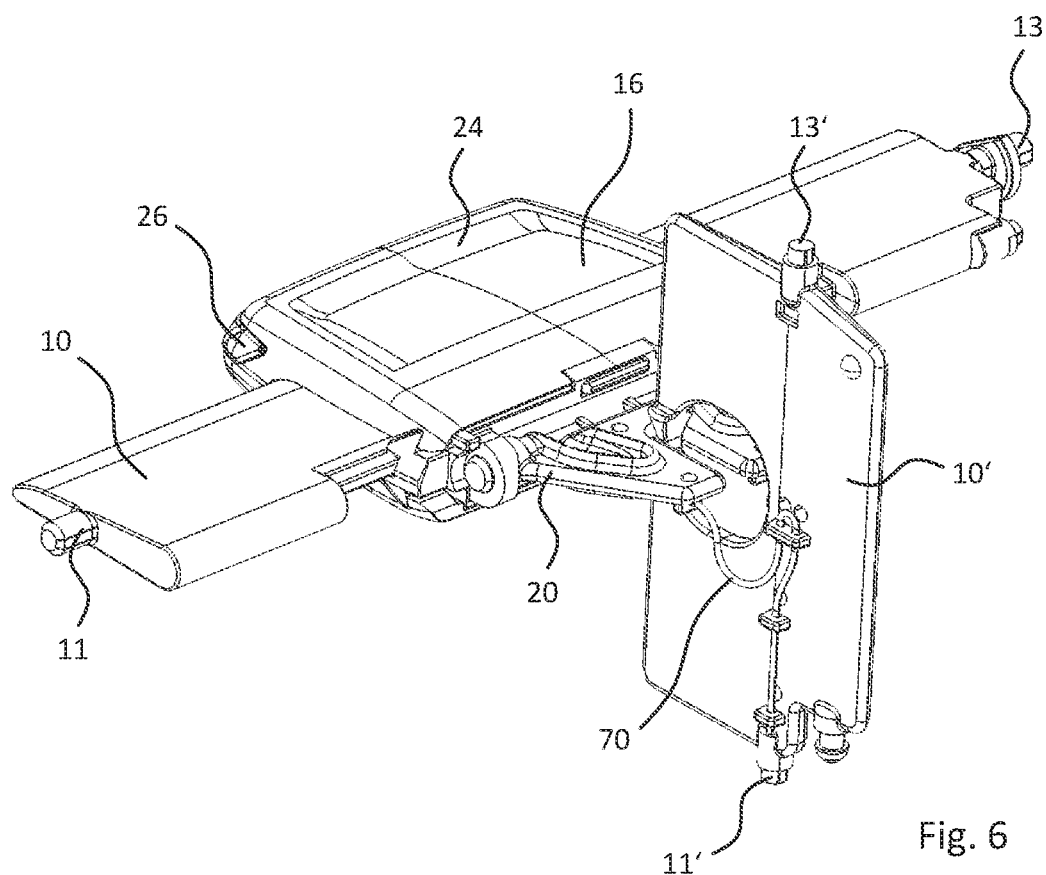
FIG. 6 shows a perspective rear side view of an air-guiding arrangement according to the invention in a further exemplary embodiment.

FIG. 6 shows a further exemplary embodiment of an air-guiding arrangement according to the invention which largely corresponds to the air-guiding arrangement shown in FIGS. 1 to 5. The exemplary embodiment of FIG. 6 differs merely in terms of the electrical supply of the light source 29 arranged on the printed circuit board 28. Thus, in the case of the exemplary embodiment of FIG. 6, instead of the electrical conductors 38, 40 guided through the air-guiding element 10, there is provided a cable supply via electrical cables, of which one designated by the reference sign 70 can be seen in FIG. 6. The cable 70 is guided along a further air-guiding element 10' which is held in the fork holder 20 and is pivotable perpendicular to the pivot axis of the air-guiding element 10 along a pivot axis defined by two pivot pins 11' and 13' by the operating element 12 being displaced laterally on the air-guiding element 10. No electrical conductors are provided in the air-guiding element 10 in this exemplary embodiment. Instead, the cables 70 are guided outward from the printed circuit board 28 through suitable bores in the closing part 30 and then from the closing part 30 along the fork holder 20 up to the air-guiding element 10', which is likewise designed as an air-guiding slat, and from there out of the housing to an electrical supply, as can be seen in FIG. 6 for the cable 70. The cables 70 also serve by means of a sufficient length to compensate for the relative movement between the operating element 12 and the air-guiding element 10.

LIST OF REFERENCE SIGNS 10, 10' Air-guiding element
11, 11', 13, 13' Pivot pin
12 Operating element
16 Housing
20 Fork holder
22 Receptacle
24 Operating portion
26 Insert portion
28 Printed circuit board
29 Light source
30 Closing part
34, 36 Silicone damper
38, 40 Electrical conductor
42 Cavity
46 Plug
48, 50 Electrical conductor
52, 54 First holder
56, 58 Second holder
60, 62 Conductor strip
64, 66 Third holder
65, 67 Conductor track
68 Plug
70 Cable

What is claimed is:

1. An air-guiding arrangement for a vehicle air vent, comprising an air-guiding element and an operating element, wherein the operating element is movable relative to the air-guiding element and has a manually actuatable operating portion arranged on a front side of the air-guiding element, wherein a light source is arranged in the operating portion of the operating element, wherein at least one electrical conductor is connected to the light source and can be connected to an electrical supply source, wherein, for electrical connection between the light source and the at least one electrical conductor, at least one elastic electrical connecting element is provided that is held fixedly on the air-guiding element and that is held fixedly on the operating element, wherein the at least one elastic electrical connecting element deforms elastically during a relative movement between the air-guiding element and the operating element.

2. The air-guiding arrangement as claimed in claim 1, wherein the air-guiding element is an air-guiding slat which is mounted pivotably in a housing of an air vent.

3. The air-guiding arrangement as claimed in claim 2, wherein at least one electrical conductor is integrated into at least one pivot pin of the air-guiding slat for pivotably mounting the air-guiding slat on the housing of the air vent.

4. The air-guiding arrangement as claimed in claim 1, wherein the operating portion comprises a light outlet portion to let out the light emitted by the light source.

5. The air-guiding arrangement as claimed in claim 4, wherein the light outlet portion is formed by an insert portion of the operating element that is inserted into the operating portion and is permeable to light from the light source.

6. The air-guiding arrangement as claimed in claim 1, wherein the operating element has a housing, wherein the housing is arranged on the air-guiding element.

7. The air-guiding arrangement as claimed in claim 6, wherein the operating element comprises a closing part which is releasably connected to the housing and closes one side of the housing.

8. The air-guiding arrangement as claimed in claim 7, wherein the insert portion is arranged in the housing.

9. The air-guiding arrangement as claimed in claim 1, wherein the operating element is a sliding operating element or a rotary operating element.

10. The air-guiding arrangement as claimed in claim 1, wherein the at least one elastic electrical connecting element is at least one elastic conductor strip bent in a U-shape and having a first leg held on a first holder connected to the electrical conductor and a second leg held on a second holder connected electrically to the light source.

11. The air-guiding arrangement as claimed in claim 10, wherein the at least one electrical conductor is arranged in the air-guiding element.

12. The air-guiding arrangement as claimed in claim 10, wherein the light source comprises at least one OLED and/or at least one electroluminescent film.

13. The air-guiding arrangement as claimed in claim 10, wherein the light source comprises at least one COB-LED or at least one COC-LED.

14. An air vent, comprising a housing and the air-guiding arrangement as claimed in claim 1 arranged in the housing.

* * * * *